May 23, 1939. F. R. LACY, JR 2,159,876
ELECTRICALLY HEATED CONTAINER
Filed April 12, 1937
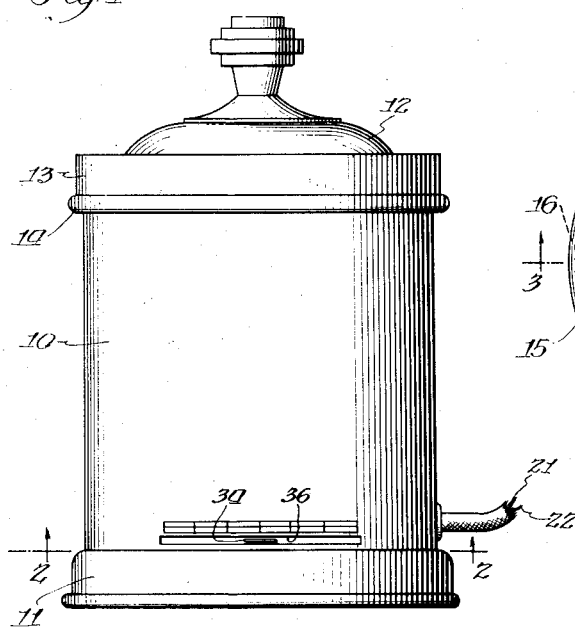
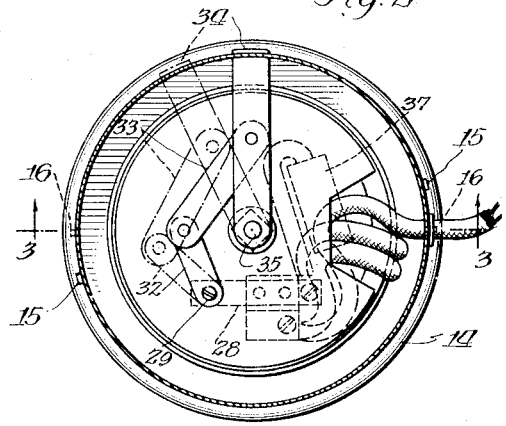
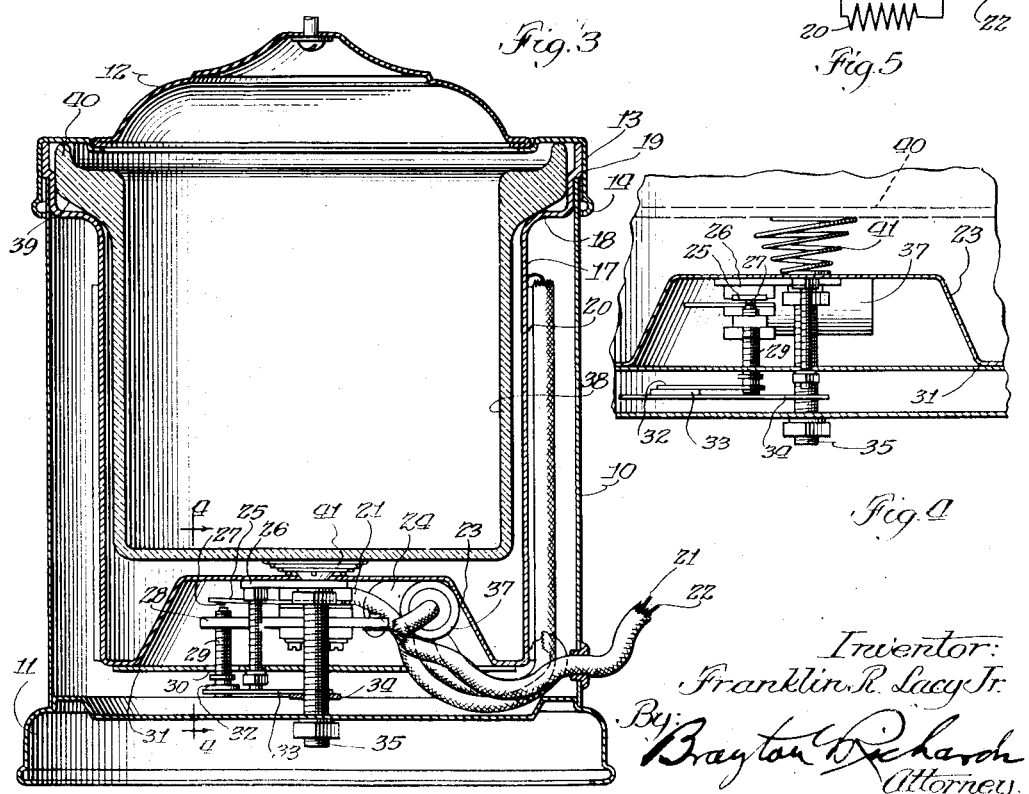
Inventor:
Franklin R. Lacy Jr.
By: Brayton Richards
Attorney Patented May 23, 1939

2,159,876

UNITED STATES PATENT OFFICE 2,159,876

ELECTRICALLY HEATED CONTAINER

Franklin R. Lacy, Jr., Chicago, Ill., assignor to Lacy Products Corp., Chicago, Ill., a corporation of Illinois Application April 12, 1937, Serial No. 136,247

3 Claims. (Cl. 219—43)

The invention relates to improvements in electrically heated containers especially adapted for containing hot fudge for use in conjunction with soda fountains, restaurants or the like, the primary object of the invention being the provision of an improved construction of this character which is capable of economical production and highly efficient in use.

Other objects will appear hereinafter.

The invention consists in the combinations and arrangements of parts hereinafter described and claimed.

The invention will be best understood by reference to the accompanying drawing forming a part of this specification and in which Fig. 1 is a front or face view of a container embodying the invention;

Fig. 2 a bottom plan view taken substantially on line 2—2 of Fig. 1;

Fig. 3 an enlarged transverse section taken substantially on line 3—3 of Fig. 2;

Fig. 4 a section taken substantially on line 4—4 of Fig. 3; and

Fig. 5 a diagrammatic view of the electric circuit employed in the construction.

The embodiment of the invention illustrated in the drawing comprises an outer cylindrical metallic shell 10 supported as indicated upon a suitable base 11 and having a removable cover 12. The cover 12 is provided with a peripheral depending flange 13 fitting over the top of said shell and provided at its lower edge with a bead or channel 14. The channel 14 is provided with diametrical notches 15 adapted to fit over locking pins 16 on the sides of the shell 10 whereby said cover may be readily locked in position on said shell as will be readily understood.

An inner cylindrical metallic casing 17 is fitted loosely within the shell 10 as shown. The casing 17 is provided at its top with an outwardly extending supporting lip 18 and with a shoulder 19 resting loosely on top of the shell 10. An electrical heating element 20 surrounds the casing 17 and is connected as indicated in circuit with electrical leads or supply wires 21 and 22 for actuating the same to heat the casing 17.

As shown, the casing 17 is provided with a re-entrant bottom 23 forming a supplemental heating chamber 24 projecting upwardly into the body of the casing 17. A bi-metallic thermostatic element 25 is mounted as shown upon an insulating block 26 in the heating chamber 24 and is provided with an electric contact point or block 27 as best shown in Figs. 3 and 4. A metallic bar 28 is mounted, as shown, immediately below the element 26 but is insulated therefrom, the bar 28 being electrically connected as shown with the lead 22 and the element 25 with the lead 21. The bar 28 carries a threaded adjusting contact or post 29 projecting downwardly through an opening 30 in the bottom plate 31 and equipped at its lower end with operating arm 32 connected by link 33 with an adjusting lever 34 pivotally mounted on a central assembling screw 35 and projecting forwardly through a slot 36 in the front wall of the shell 10. A quench-spark condenser 37 is connected as indicated across the members 25 and 28 to quench any spark caused by the breaking of the circuit in the regulation of the heating.

A porcelain bowl 38 is arranged as shown loosely within the casing 17 and is provided at its upper end with an outwardly extending supporting rim 39 resting upon the lip 18 as shown. The rim 39 is provided with an upwardly extended peripheral flange 40 contacting with the under side of the cover 12 so that said cover will normally hold said bowl in place when the cover is is closed position. A coil compression spring 41 is positioned as shown between the bottom of the bowl 38 and the top of the heating chamber 24 so that when the cover 12 is removed the bowl 38 will be automatically elevated to facilitate access to the contents thereof and also removal when desired.

The heater disclosed is especially adapted for use for containing hot fudge for soda fountains, restaurants or the like. In operation when the temperature of the fudge cools below a predetermined point the thermostatic element 25 operates automatically to close the electric circuit thereby actuating the heating element 20 to restore the requisite heat of the contents of the bowl 38 as will be readily understood. As soon as the requisite heat is attained, the element 25 will operate automatically to break the electric circuit thereby temporarily discontinuing the heating action and automatically maintaining the temperature of the fudge between desired limits. By adjusting lever 34 the screw 29 may be adjusted as desired to maintain the heat limits at any temperatures desired. By arranging the thermostat within the supplemental heating chamber 24, the same is subjected to substantially the same heating action as is the material contained in the bowl 38 so that the regulation of the heat therefor may be more accurately adjusted. The specific form and arrangement of parts is a simple and effective one for the purpose.

While I have illustrated and described the preferred form of construction for carrying the invention into effect, this is capable of variation and modification without departing from the spirit of the invention. I, therefore, do not wish to be limited to the precise details disclosed, but desire to avail myself of such variations and modifications as fall within the scope of the appended claims.

I claim:

1. A warming device for warming foods and the like, said warming device comprising an outer shell, a casing within the shell and spaced therefrom to provide an enclosure between said shell and said casing, an electrical heating element mounted within said enclosure, a bowl for containing substance or the like, said bowl being adapted to be arranged within said shell and casing and having its bottom wall spaced a substantial distance from the lower portions of said shell and said casing, a control chamber formed within said casing and spaced from the casing and having upwardly converging walls, said control chamber containing a thermostatic control element for constantly controlling the temperature of a mass of substance in the bowl and for controlling said temperature in accordance with a predetermined value, said chamber being below the bowl and spaced therefrom, and said heating element being arranged in said housing so that it resides opposite said bowl and extends downwardly a substantial distance below said bowl and being arranged about said control chamber whereby the thermostatic control chamber as well as the bottom of the bowl is subjected to substantially direct heating by the heating unit to maintain an accurate control of temperature within the device, and compression spring means arranged in the space below the bowl between the thermostatic control chamber and the bottom portion of the bowl.

2. A warming device for warming foods and the like, said warming device comprising an outer shell, a casing within the shell and spaced therefrom to provide an enclosure between said shell and said casing, an electrical heating element mounted within said enclosure, a bowl for containing substance or the like, said bowl being adapted to be arranged within said shell and casing and having its bottom wall spaced a substantial distance from the lower portions of said shell and said casing, and a control chamber formed within said casing and containing a thermostatic control element for determining the temperature of a mass of substance in the bowl and for controlling said temperature in accordance with a predetermined value, said chamber being below the bowl, and said heating element being arranged in said housing so that it resides opposite said bowl and extends downwardly a substantial distance below said bowl and being arranged about the region of said control chamber whereby the thermostatic control chamber as well as the bottom of the bowl is subjected to substantially direct heating by the heating unit to maintain an accurate control of temperature within the device.

3. In an electrical warming device having a generally cylindrical outer shell, a bowl adapted to be arranged within the shell for containing substance to be warmed, a compression spring arranged between the bottom of said shell and the lower portion of said bowl and adapted to exert a force against both of said elements when said bowl is in normal operative position within the shell, said shell having an open top, a rim member engageable about the upper edge of said shell and having inwardly projecting flange portions adapted to engage over said shell and the upper edges of said bowl to retain said bowl in operative position, said rim and the upper portions of said shell having interlocking means thereon adapted to retain said parts together, and hinged cover means mounted on said rim for permitting access to the interior of the bowl, said cover means permitting supply and withdrawal of substance from the bowl, and said releasable rim-interlocking means permitting release and removal of the bowl from the shell under the influence of the spring means when the rim is unlocked from the shell.

FRANKLIN R. LACY, Jr.